(No Model.) 2 Sheets—Sheet 1.
T. A. EDISON.
REGULATOR FOR DYNAMO ELECTRIC MACHINES.
No. 264,672. Patented Sept. 19, 1882.
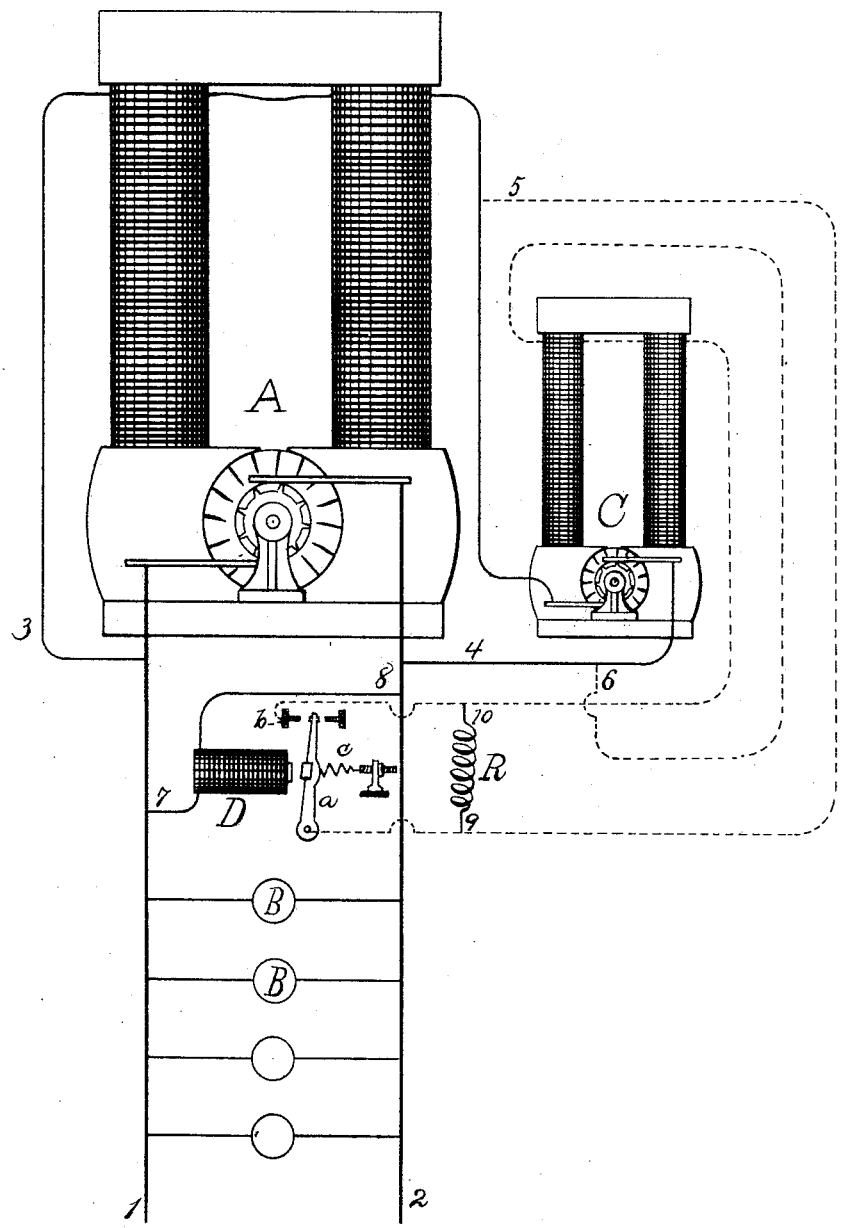
WITNESSES:
E. C. Rowland
W W Seely
INVENTOR:
T. A. Edison
BY Rich N. Dyer,
ATTORNEY.

(No Model.) 2 Sheets—Sheet 2.
T. A. EDISON.
REGULATOR FOR DYNAMO ELECTRIC MACHINES.
No. 264,672. Patented Sept. 19, 1882.
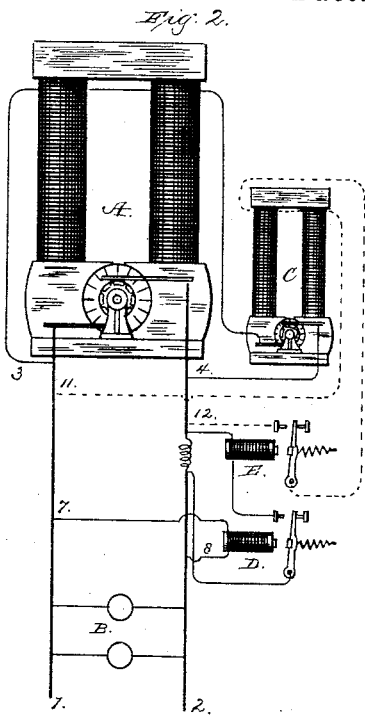
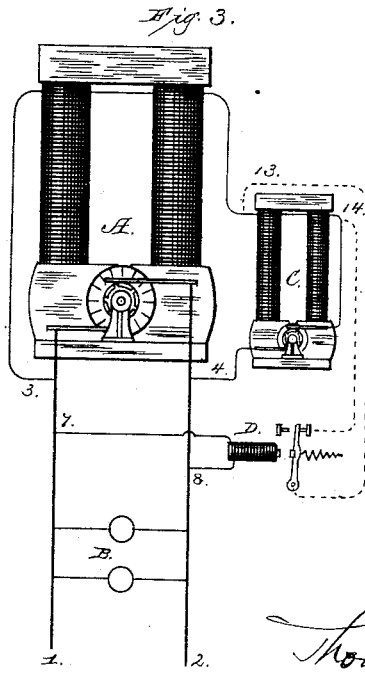

UNITED STATES PATENT OFFICE.

THOMAS A. EDISON, OF MENLO PARK, NEW JERSEY.

REGULATOR FOR DYNAMO-ELECTRIC MACHINES.

SPECIFICATION forming part of Letters Patent No. 264,672, dated September 19, 188:.

Application filed August 7, 1882. (No model.)

*To all whom it may concern:*

Be it known that I, THOMAS A. EDISON, of Menlo Park, in the county of Middlesex and State of New Jersey, have invented a new and useful Improvement in Means for Regulating Electrical Generators, (Case No. 426;) and I do hereby declare that the following is a full and exact description of the same, reference being had to the accompanying drawings, and to the letters of reference marked thereon.

The object I have in view is to produce simple and efficient means for regulating the generative capacity of a dynamo or magneto electric machine by the counter electro-motive force of an electromotor located in its field-of-force circuit, and for governing or controlling the counter electro-motive force generated by such motor, so as to counteract variations in speed of engine, as well as number of lamps or other translating devices.

This invention is an improvement upon the special means described in my Patent No. 248,421. I accomplish the object sought by arranging the armature-coils of the motor directly in the field-circuit of the generator and the field-magnet coils of the motor in a circuit which is controlled by a vibrating circuit-controller operated directly or controlled by an electro-magnet arranged in a multiple-arc circuit from the main conductors of the generator. The field-circuit of the motor may be a shunt from the field-circuit of the generator around the armature-coils of the motor; or it may be a multiple-arc circuit from the main conductors of the generator; or the field-coils of the motor may be arranged in series with its armature-coils in the field-circuit, and the field-magnet of the motor be weakened and strengthened by closing and opening a shunt around the same. A shunt of high resistance is preferably formed around the vibrating circuit-controller, so that the motor will always have sufficient strength of field to run at a low speed. The armature of the operating or controlling electro-magnet in the multiple-arc circuit is provided with an adjustable retractor, so that the candle-power of the lamps can be adjusted.

The foregoing will be better understood from the drawings, in which Figure 1 is a view, partly diagrammatic, of an apparatus embodying the invention, and Figs. 2 and 3 similar views of modified connections.

A represents a dynamo or magneto electric machine, from which run main conductors 1 2, in multiple-arc circuits from which are located lamps or other translating devices, B. The field-circuit 3 4 of the generator is preferably a multiple-arc circuit from the main conductors 1 2. In this field-circuit are located the armature-coils of an electro-dynamic motor, C. The field-circuit 5 6 of the motor C is shown in Fig. 1 as a shunt from 3 4 around the armature-coils of the motor. This circuit 5 6 runs to the armature-lever *a* and its front contact, *b*. Said lever carries an armature attracted by an electro-magnet, D, located in a multiple-arc circuit, 7 8, from 1 2, and the lever is retracted by an adjustable spring, *c*. The magnet and lever form a vibrating circuit-controller, which, when closed, allows the field-magnet of the motor to strengthen, increasing the speed of the motor and its counter electro-motive force, and when open breaks the field-circuit of the motor, reducing its speed and counter electro-motive force. The motor is not, however, stopped entirely, since a shunt, 9 10, containing resistance R, is formed around the vibrating circuit-controller, and allows some current always to flow through the field of the motor. This resistance also reduces the spark at the points of the vibrating circuit-controller. It will be seen that the speed of the motor is increased by the strengthening of the magnet D and lessened by the weakening of such magnet, which is affected both by variations in speed and number of translating devices. If desired, the vibrating circuit-controller may break circuit at a number of points simultaneously in order to reduce the spark. This circuit-controller may be operated by the magnet D, arranged in multiple arc; or this magnet D may be used to open and close the circuit of another magnet, E, arranged in a shunt from one of the main conductors, Fig. 2, or from the field-circuit of the generator, which latter magnet will operate the vibrating circuit-controller.

As before explained, the field-circuit of the motor, instead of being a shunt from the field-circuit of the generator around the armature-coils of the motor, may be a multiple-arc circuit, 11 12, from 1 2, opened and closed by the electro-magnet D, or by an electro-magnet, E, in a local circuit controlled by D as a relay, Fig. 2; or the field-coils of the motor may be arranged in series with its armature-coils and a shunt-circuit, 13 14, be formed around the field-magnet of the motor, Fig. 3, which shunt will be opened and closed by D or a magnet controlled by it, the operation, however, being the reverse of the other constructions.

What I claim is—

1. The combination, with a dynamo or magneto electric machine, of an electro-dynamic motor arranged in the field-circuit of such generator, and means in a separate multiple-arc circuit operated by the current for controlling the field-circuit of the motor, substantially as set forth.

2. The combination, with a dynamo or magneto electric machine, of an electro-dynamic motor arranged in the field-circuit of the generator, and an electro-magnet located in a multiple-arc circuit from the main conductors of the generator, and arranged to control directly or indirectly the field-circuit of the motor, substantially as set forth.

3. The combination, with a dynamo or magneto electric machine, of an electro-dynamic motor arranged in the field-circuit of the generator, a vibrating electro-magnetic circuit-controller controlling the field-circuit of the motor, and a shunt of high resistance around such vibrating circuit-controller, substantially as set forth.

This specification signed and witnessed this 22d day of May, 1882.

THOMAS A. EDISON.

Witnesses:
EDW. C. ROWLAND,
C. P. MOTT.